United States Patent Office 2,897,650
Patented Aug. 4, 1959

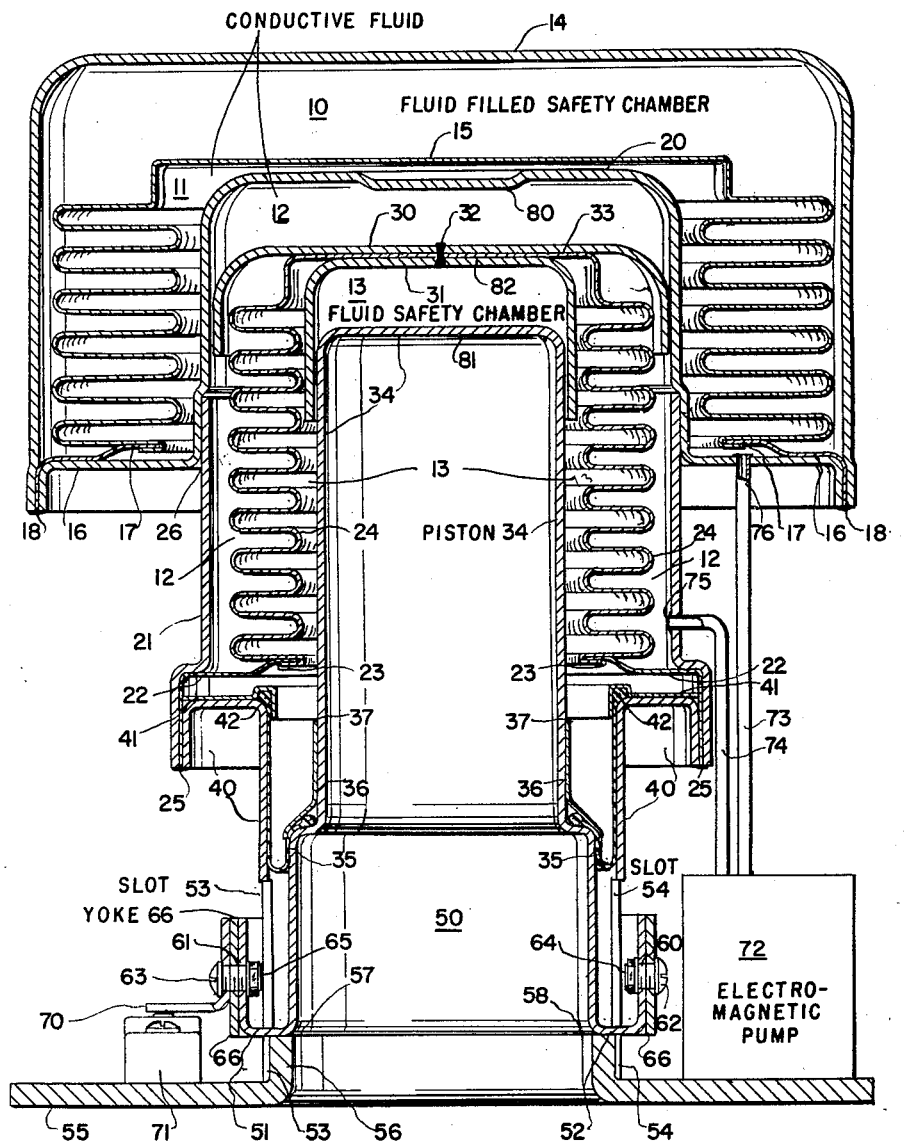

2,897,650

FLUID ACTUATOR

William L. Carlson, Jr., Bloomington, and Raynold C. Erickson, Minneapolis, Minn., assignors to Minneapolis-Honeywell Regulator Company, Minneapolis, Minn., a corporation of Delaware Application August 28, 1957, Serial No. 680,793

15 Claims. (Cl. 60—52)

The present invention is directed to a type of hydraulic actuator, and more specifically is directed to an actuator which may utilize a highly corrosive conductive liquid metal such as sodium, potassium, or a sodium potassium mixture.

In recent years numerous hydraulic systems have been developed utilizing conductive fluids such as mercury, sodium, potassium, and sodium-potassium mixtures. While most of the systems have utilized the conductive liquid metals as cooling media in heat transfer systems other applications have also arisen. An example of such a system is the combination of a pump and a plurality of variable volume chambers which are used to obtain motion when a conductive liquid metal is moved. Due to the corrosive nature of the sodium and potassium types of conductive liquid metals it has been necessary to engineer and build hydraulic actuators which are hermetically sealed and which have adequate safety features in case of a rupture of one of the hermetically sealed chambers. In order to use a hydraulic actuator which is filled, for example, with a sodium-potassium mixture in residential and commercial applications it is necessary to build an actuator which can adequately contain the corrosive fluid under all operating conditions. It is also necessary to supply a unit which has mechanical practicability and which is further economical to build.

It is the object of the present invention to disclose an actuator which is capable of handling highly corrosive types of liquid metals and other fluids in a hermetically sealed system.

A further object is to provide an actuator which has a sealed air or gas filled chamber which acts as a return spring on the unit as well as acting as a safety chamber in case of a rupture or leak in certain of the conductive fluid filled sections.

Yet another object of the present invention is to disclose a hydraulic type of actuator which can be used either as a normally open or a normally closed device.

Still another object is to provide an actuator which is compact and which is capable of supplying a high force in a quiet manner and which further can be used either as an "off-on" device or which can be fully modulated.

Another object is to disclose an actuator which uses bellows sealed chambers that have an exceptionally long life. This long life is a result of the pressure differential across the bellows remaining substantially zero at all times.

These and other objects will become apparent when the single sheet of drawings is considered with the following specification.

The presently disclosed actuator is shown in its down or "on" position and has a plurality of substantially concentric pressure tight chambers. The first three chambers 10, 11, and 12 are all variable in volume as will become apparent when the entire device is considered. The chamber 13 has a fixed volume but has a variable configuration. The first chamber 10 is formed between a cup-shaped outer housing 14 and a bellows 15. The housing 14 and the bellows 15 are joined by means of a bottom plate 16 which is welded or sealed to the bellows 15 at 17 and to the outer housing 14 by means of a weld at 18. The volume of chamber 10 can easily be varied by expanding or contracting the bellows 15 as will be subsequently noted. The chamber 10 is filled with gas or air by a filler tube (not shown). In a normally "off" condition the chamber 10 is filled to near atmospheric pressure, while in normally "on" condition the chamber 10 is filled with gas or air to a sufficient pressure to collapse the bellows 15 to the position shown in the drawings. The use for the normally "on" or normally "off" positions will become apparent later in the description of the operation of the device.

The second variable volume chamber 11 is formed between the bellows 15 and a cup-shaped fixed inner housing 20. The housing 20 is joined to the bottom plate 16 at the weld 18 and it can therefore be seen that a complete pressure tight chamber 11 is formed. It is obvious that the volumes of chambers 10 and 11 vary differentially with one another. As the chamber 10 is expanded the chamber 11 must contract since these two chambers have a common wall in the form of a bellows 15.

The third variable volume chamber 12 is formed partially by the cup-shaped housing 20 and a cylindrical extension 21. The cylindrical extension 21 is joined to a bottom plate 22 which is in turn joined at 23 to a second bellows 24. The joint between the bottom plate 22 and the cylindrical extension 21 occurs at a welded joint 25 and the variable volume chamber 12 is thereby formed. The cylindrical extension 21 is joined to the housing member 20 at 26 by means of a weld or solder joint.

Two guide members 30 and 31 are welded at 32 to the top 33 of the bellows 24 and provide support therefor. The guide 30 insures that the bellows 24 is kept well centered within the upper section of housing 20 while the guide 31 protects the upper section of the bellows 24 and guides a piston-like housing 34. The piston-like housing 34 is further joined to a flexible diaphragm 35 by means of a clamping ring 36 which is appropriately spot welded or attached to the piston-like member 34 at edge 37. A bottom frame member 40 supports a sealer ring 41 which in turn clamps the second edge 42 of the diaphragm 35. The bottom frame member 40 further attaches by means of weld 25 to the inner surface of the bottom plate 22 which is inside of the cylindrical extension 21. It is thus apparent that a complete fluid tight chamber 13 is formed between the bellows 24, a piston-like member 34, diaphragm 35, bottom sealer ring 41 and the bottom plate 22. The chamber 13 is a fixed volume chamber even though the walls of the chamber move relative to one another. The reason chamber 13 is fixed in volume will become apparent when a consideration of the operation of the device is undertaken.

The piston-like member 34 has at its bottom 50 two U-shaped extensions 51 and 52. The U-shaped extensions 51 and 52 ride in two slots 53 and 54 of the bottom frame member 40. The bottom frame member 40 is in turn attached to a heavy metal plate 55 which acts as a base for the entire unit. The base 55 has an annular flange 56 which forms an annular inner opening in the base 55. The annular flange 56 attaches to the bottom of the frame member 40 and further acts as a stop at 57 and 58 for the U-shaped members 51 and 52.

The U-shaped members 51 and 52 each have a hole therethrough 60 and 61 through which are placed appropriate bolts 62 and 63 which further have the nuts 64 and 65 attached thereto. The bolts 62 and 63 hold a U-shaped bracket 66 rigidly against the sides of the U-shaped members 51 and 52. If the U-shaped members 51 and 52 are raised or lowered in the slots 53 and 54, the U-shaped bracket 66 will supply a vertical type of motion. This motion can be utilized to drive the wiper of a potentiometer or switching members (not shown), if desired.

The bolt 63 further holds a bracket 70 to the U-shaped member 51. The bracket 70 operates against a switch 71 which is mounted by any convenient means on the base 55. It is obvious that the bracket 70 could be used to operate the switch at its lower position, as shown, or at any intermediate position where switch 71 could be conveniently located. The addition of limit switches at other such points of travel of the bracket 70 would be obvious to those skilled in the art.

A pump 72 is mounted on the base 55 and has inlet and outlet tubes 73 and 74. The tube 74 is connected to the variable chamber 12 by passing through the wall of cylindrical extension 21 at 75. The tube is sealed in a fluid tight manner, preferably by welding. The tube 73 extends into the pressure tight chamber 11 at 76. The tube 73 is also appropriately welded to the bottom edge of the housing 20 in a fluid tight manner.

As previously pointed out the chamber 10 is filled with gas or air. The remaining chambers are filled with fluids which are not compressible in nature. The chambers 11 and 12 contain a conductive fluid such as liquid metals mercury, sodium, potassium, or a sodium-potassium mixture. In the preferred embodiment the sodium-potassium mixture is utilized as it is a liquid at normal room ambient temperatures. For low temperature applications mercury can be used since it is liquid at relatively low temperatures, while sodium or potassium can be used separately for high temperature applications. The properties and melting points of these metals are well known to those versed in the art and will not be given in detail at the present time. As noted previously, the preferred embodiment contains a sodium-potassium mixture which is a fluid at above temperature of 12° F.

The fourth chamber 13 is filled with a non-compressible fluid such as an oil. It will be noted that the selection of the proper oil can be made so that if a rupture occurs in the bellows 24 the mixture of the oil and the liquid metal will create no noticeable reaction. Normally a sodium-potassium mixture ignites and burns when exposed to the atmosphere and the oil fill contained in chamber 13 isolates the liquid metal in chamber 12 upon a failure or rupture of the bellows 24. This same safety feature exists in the case of a rupture of the bellows 15 and the subsequent release of the liquid metal from chamber 11 into chamber 10. Since chamber 10 is a completely sealed chamber the release of the liquid metal from the chamber 11 into chamber 10 will create no hazardous conditions. It is thus apparent that a device has been supplied which can be filled with a conductive liquid metal such as sodium-potassium and which has adequate safety chambers in case of a rupture of the variable volume chambers which contain the liquid metal.

The chance of a rupture of a bellows in the present device is very remote as the pressure chambers are arranged so that a substantially zero pressure differential exists across each bellows at all times. The life of a bellows when flexed is partly a function of the pressure differential across it. With a substantially zero pressure differential across the bellows, their life is great enough to insure a long reliable operating life for the entire device.

The operation of the present hydraulic actuator can be best understood by considering the actuator in what can be called its normally closed or "on" condition. This is a position wherein the piston-like member 34 is in its most downward location so that the bottom of the U-shaped legs 51 and 52 are touching the annular rim 56. Under these conditions the chamber 10 is at its maximum volume while chamber 11 is at its minimum volume. The chamber 12 under these circumstances has its maximum volume while the chamber 13 has remained constant at all times. If it is desired to operate the device from the position shown in the drawings to its normally "off" position the pump 72 is energized to move the fluid from the chamber 12 to chamber 11 by means of tubes 74 and 73. When a conductive liquid metal is utilized as the operating fluid in the actuator, the pump 72 can be of the electromagnetic type. This type of pump utilizes the principles discovered by Faraday wherein a conductive fluid is caused to move under the influence of mutually perpendicular currents and flux fields. This type of pump is well known in the art and has been used extensively in the movement of conductive liquid metals in such devices as atomic reactors and in certain types of laboratory equipment. Since an electromagnetic type of pump has no moving parts, other than the fluid flowing through it, it is a perfectly quiet device and one which can be modulated by varying the power input to the magnetic field and/or to the current which flows perpendicular to the field and the conductive fluid. It should be understood that the pump 72 could be of a more conventional nature but the preferred embodiment utilizes the electromagnetic type of pump.

If the fluid in chamber 12 is moved by way of tube 74 through pump 72 and into the tube 73, it becomes apparent that the bellows 24 must expand in an upward direction to displace the fluid removed. It is further obvious that as the fluid is added to the chamber 11 by means of the tube 73 that the bellows 15 would expand and thereby decrease the volume of the chamber 10. This expansion of the bellows 15 will further compress the gas or air fill which is contained in the chamber 10. The compressed gas then acts as a spring-like member which tends to return the device to the position shown in the drawing whenever the pump 72 is de-energized. An electromagnetic type pump has no mechanical impediments and allows free flow of fluid through it when it is de-energized. As the pump continues to operate the bellows 24 would expand until the guide 30 strikes the downward projection 80 of the housing 20. At this particular time the piston-like member 34 will have been forced to move in an upward direction until the top 81 of the piston-like member 34 had reached the top 82 of the guide member 31. During this operation the entire piston-like member 34 would raise thereby lifting the bottom 50 including the U-shaped members 51 and 52 thereof in the slots 53 and 54. The movement of the U-shaped members 51 and 52 would thereby operate the switch 71 as well as move the yoke 66 such that any attached device (not shown) would be operated from one extreme to another. As soon as the energization of the pump 72 is removed the compressed gas in chamber 10 would cause the chamber to expand thereby compressing the bellows 15 and decreasing the volume of chamber 11. This causes the fluid flow back through the tube 73, pump 72 (which has an open channel) and tube 74 to return the device to the position shown. If a valve stem or damper operator were attached to the inside of the piston-like housing 34 the valve stem or damper operator would move with this device. It is therefore obvious that the present device could be utilized to provide linear motion in conjunction with externally mounted units of most any type.

The operation of the device just disclosed was for a condition which was stated as the normally "on" condition. If the air chamber 10 is filled to atmospheric pressure only in the "off" or up position the reverse operation can be accomplished by spring loading the piston-like member 34 to its uppermost location. Under these circumstances the pump 72 would remove fluid from chamber 11 via the tube 73 and inject this fluid into chamber 12 by means of tube 74. This operation would cause the chamber 12 to expand thereby operating on the oil fill in the chamber 13 to cause the piston-like member 34 to be driven in a downward direction. It will thus be appreciated that the present device can be used on either the normally "on" or normally "off" position depending on whether a spring bias is added within the piston-like chamber 34 or whether a compressed gas or air charge is added to the chamber 10. By providing a unit which is flexible in this way the production of normally "on" or normally "off" devices can be accomplished by producing a single unit which merely needs the addition of compressed air to one sealed chamber after the production of the unit has been completed.

From a consideration of the present device it becomes obvious that an unusual type of unit has been provided. The present unit can be utilized either as a normally "on" or a normally "off" device by merely changing the pressure in a single chamber. This device further provides a unit which is capable of exceedingly quiet operation and the device is further completely safe. In utilizing a conductive liquid metal such as sodium-potassium the safety of the surrounding area is essential as it has been previously noted that the release of this liquid to the atmosphere may cause the liquid to burst into flame. The present device provides a safety chamber on each side of the moving members so that any rupture of the containing bellows yields an inoperative condition but one which is safe to the property or personnel around the device. The present unit is further capable of delivering completely modulated motion and the unit can operate auxiliary devices such as potentiometers and switches, thereby being completely flexible in its application. The unit further can utilize an electromagnetic conductive liquid metal pump which is silent in operation or this unit may utilize more conventional types of pumps if that is desired.

In fully considering the present unit many modifications and changes will come to the minds of those versed in the art and it is understood that the present disclosure is illustrative only of the preferred embodiment and is meant in no way to restrict the application of the present invention. The applicants wish to be limited only to the extent of the appended claims.

We claim as our invention:

1. In a pressure operated actuator of the class described: a housing having a plurality of substantially concentric pressure tight chambers; said housing further having two relatively movable outer sections which are sealed in a pressure tight relationship by flexible means; a first said chamber being gas filled; a second said chamber being filled with a fluid and differentially variable in volume with said first chamber; a third said chamber being filled with said fluid and connected to said second chamber by means including a pump; a fourth said chamber filled with a noncompressible fluid; said third and fourth chambers having a common flexible wall; and said fourth chamber further having one of said movable outer sections as a portion thereof; said portion moving in response to the movement of said flexible wall as the volume of said third chamber is varied upon operation of said pump.

2. In a pressure operated actuator of the class described: a housing having a plurality of substantially concentric pressure tight chambers; said housing further having two relatively movable outer sections which are sealed in a pressure tight relationship by flexible means; a first said chamber being gas filled; a second said chamber being filled with a conductive fluid and differentially variable in volume with said first chamber; a third said chamber being filled with said conductive fluid and connected to said second chamber by means including an electromagnetic conductive fluid pump; a fourth said chamber filled with an oil; said third and fourth chambers having a common flexible wall; and said fourth chamber further having one of said movable outer sections as a portion thereof; said portion moving in response to the movement of said flexible wall as the volume of said third chamber is varied upon operation of said pump.

3. In a pressure operated actuator of the class described: a housing having a plurality of substantially concentric pressure tight chambers; said housing further having two relatively movable outer sections which are sealed in a pressure tight relationship by a flexible diaphragm; a first said chamber being filled with air; a second said chamber being filled with a liquid metal and differentially variable in volume with said first chamber; a third said chamber being filled with said liquid metal and connected to said second chamber by means including an electromagnetic conductive fluid pump; a fourth said chamber filled with oil; said third and fourth chambers having a common flexible wall; and said fourth chamber further having one of said movable outer sections as a portion thereof; said portion moving in response to the movement of said flexible wall as the volume of said third chamber is varied upon operation of said pump.

4. In a pressure operated actuator having a first condition: a housing having a plurality of substantially concentric pressure tight chambers; said housing further having two relatively movable outer sections which are sealed in a pressure tight relationship by a flexible diaphragm; a first said chamber being filled with air; a second said chamber being filled with a liquid metal and differentially variable in volume with said first chamber; a third said chamber being filled with said liquid metal and connected to said second chamber by means including an electromagnetic liquid metal pump; a fourth said chamber filled with oil; said third and fourth chambers having a common flexible wall; and said fourth chamber further having one of said movable outer sections as a portion thereof; said portion moving in response to the movement of said flexible wall as the volume of said third chamber is varied upon operation of said pump; said operation in turn varying the volume of said air filled chamber thereby changing the air pressure; said changed air pressure acting as a bias upon said actuator tending to return the actuator to its first condition upon de-energization of said pump.

5. In a pressure operated actuator of the class described: a pressure tight housing having two relatively movable sections joined by flexible means; said housing being divided into a plurality of pressure tight chambers; a first said chamber being gas filled; a second said chamber being filled with a first fluid; said second chamber further varying differentially in volume with said first chamber; a third said chamber being filled with said fluid and being connected to said second chamber by means including a pump; and a fourth said chamber being filled with a noncompressible fluid; said third and fourth chambers having a common flexible wall; said fourth chamber remaining constant in volume as said first fluid varies the volume of said third chamber upon operation of said pump; said noncompressible fluid moving said movable sections relative to one another to provide motion in response to the change in volumes of said first fluid filled chambers upon operation of said pump.

6. In a pressure operated actuator of the class described: a pressure tight housing having two relatively movable sections joined by a flexible diaphragm; said housing being divided into a plurality of pressure tight chambers; a first said chamber being air filled and sealed from the atmosphere; a second said chamber being filled with a liquid metal; said second chamber further varying differentially in volume with said first chamber; a third said chamber being filled with said liquid metal and being joined to said second chamber by means including an electromagnetic conductive fluid pump; a fourth said chamber being filled with an oil; said third and fourth chambers having a common flexible wall; said fourth chamber remaining constant in volume as said liquid metal varies the volume of said third chamber upon operation of said pump; said oil moving said movable sections relative to one another to provide motion in response to the change in volume of said liquid metal filled chambers upon said operation of said pump.

7. In a pressure operated actuator having a first condition: a pressure tight housing having two relatively movable sections joined by a flexible diaphragm; said housing being divided into a plurality of pressure tight chambers, a first said chamber being air filled and sealed from the atmosphere; a second said chamber benig filled with a liquid metal; said second chamber further varying differentially in volume with said first chamber; a third said chamber being filled with said liquid metal and being joined to said second chamber by means including an electromagnetic conductive fluid pump; a fourth said chamber being filled with an oil; said third and fourth chambers having a common flexible wall; said fourth chamber remaining constant in volume as said liquid metal varies the volume of said third chamber upon operation of said pump, said oil moving said movable sections relative to one another to provide motion in response to the change in volumes of said liquid metal filled chambers upon said operation of said pump; said operation of said pump in turn varying the volume of said air filled chamber thereby changing the air pressure; said changed air pressure acting as a bias upon said actuator tending to return the actuator to its first condition upon de-energization of said pump.

8. In a liquid metal operated actuator of the class described: four concentric liquid tight chambers; a first and a second said chambers formed by two cup-shaped members and intermediate bellows: a third said chambers formed by a second bellows and the exterior of said second cup-shaped member; a fourth said chamber formed between said second bellows and an internal cup-shaped operator member; said fourth chamber being sealed liquid tight by flexible diaphragm means between said operator member and said second bellows; said first chamber containing air and being sealed from the atmosphere; said second and third chambers being filled with a liquid metal and further being connected by means including an electromagnetic conductive fluid pump; and said fourth chamber being of constant volume and filled with an oil; said operator member providing motion upon movement of said liquid metal between said second and third chambers by displacing said second bellows relative to the constant volume oil filled chamber.

9. In a liquid metal operated actuator having an initial position: fourth concentric liquid tight chambers; a first and a second said chambers formed by two cup-shaped members and intermediate bellows; a third said chambers formed by a second bellows and the exterior of said second cup-shaped member; a fourth said chamber formed between said second bellows and an internal cup-shaped operator member; said fourth chamber being sealed liquid tight by flexible diaphragm means between said operator member and said second bellows; said first chamber containing air and being sealed from the atmosphere, said second and third chambers being filled with a liquid metal and further being connected by means including an electromagnetic conductive fluid pump; said fourth chamber being of constant volume and filled with an oil; said operator member providing motion upon movement of said liquid metal between said second and third chambers by displacing said second bellows relative to the constant volume oil filled chamber; said movement increasing the volume of said air filled chamber and thereby reducing the pressure therein; said reduced pressure tending to return said actuator to said initial position upon de-energization of the pump.

10. In a pressure operated actuator of the class described wherein a highly corrosive fluid is utilized as the actuator operating medium: a housing having a plurality of substantially concentric pressure tight chambers; said housing further having two relatively movable outer sections which are sealed in a pressure tight relationship by flexible means; a first said chamber being gas filled; a second said chamber being filled with said fluid and having a common flexible wall with said first chamber; said first chamber forming an outer protective closure for said second chamber to contain said fluid if said common wall should fail; a third said chamber being filled with said fluid and connected to said second chamber by means including a pump; a fourth said chamber being filled with a non-compressible fluid; said third and fourth chambers having a common flexible wall so that said fourth chamber will contain said corrosive fluid in case of failure of the common wall between the third and fourth chambers; and said fourth chamber further having one of said movable outer sections as a portion thereof to form an output ram for said actuator; said ram moving in response to a change in the volume of said third chamber when said pump is operated.

11. In a pressure operated actuator of the class described wherein a highly corrosive conductive liquid metal is utilized as the actuator operating medium: a housing having a plurality of substantially concentric pressure tight chambers; said housing further having two relatively movable outer sections which are sealed in a pressure tight relationship by flexible means; a first said chamber being gas filled; a second said chamber being filled with said liquid metal and having a common flexible wall with said first chamber; said first chamber forming an outer protective closure for said second chamber to contain said liquid metal if said common wall should fail; a third said chamber being filled with said liquid metal and connected to said second chamber by means including an electromagnetic liquid metal pump; a fourth said chamber being filled with an oil; said third and fourth chambers having a common flexible wall so that said fourth chamber will contain said liquid metal in case of failure of the common wall between the third and fourth chambers; and said fourth chamber further having one of said movable outer sections as a portion thereof to form an output ram for said actuator; said ram moving in response to a change in the volume of said third chamber when said pump is operated.

12. In a pressure operated actuator of the class described wherein a highly corrosive conductive liquid metal is utilized as the actuator operating medium: a housing having a plurality of substantially concentric pressure tight chambers; said housing further having two relatively movable outer sections which are sealed in a pressure tight relationship by a diaphragm; a first said chamber being air filled; a second said chamber being filled with said liquid metal and having a common bellows wall with said first chamber; said first chamber forming an outer protective closure for said second chamber to contain said liquid metal if said bellows should fail; a third said chamber being filled with said liquid metal and connected to said second chamber by means including an electromagnetic liquid metal pump; a fourth said chamber being filled with an oil; said third and fourth chambers having a common bellows wall so that said fourth chamber will contain said corrosive liquid metal in case of failure of the bellows wall between the third and fourth chambers; and said fourth chamber further having one of said movable outer sections as a portion thereof to form an output ram for said actuator; said ram moving in response to a change in the volume of said third chamber when said pump is operated.

13. In a pressure operated actuator of a class described wherein a highly corrosive fluid is utilized: a gas filled safety chamber; a concentric fluid filled chamber inside said safety chamber and having a common flexible wall therewith; said outer chamber containing said fluid in case of rupture of said wall; a second fluid filled chamber; means including a pump connecting said first and second fluid filled chambers; and an oil filled safety chamber inside said second fluid filled chamber and having a second common flexible wall therewith; said second fluid filled chamber and said oil filled chamber having said second common flexible wall so that said oil can transmit any motion of said second wall; said oil mixing with said fluid in case of rupture of said second flexible wall to contain said fluid.

14. In a pressure operated actuator of a class described wherein a liquid metal is utilized: an air filled safety chamber; a concentric liquid metal filled chamber inside said safety chamber and having a common flexible wall therewith; said outer chamber containing said liquid metal in case of rupture of said wall; a second liquid metal filled chamber; means including an electromagnetic liquid metal pump connecting said first and second liquid metal filled chambers; and an oil filled safety chamber inside said second liquid metal filled chamber and having a second common flexible wall therewith; said second filled chamber and said oil filled chamber having said second common flexible wall so that said oil can transmit any motion of said second wall; said oil mixing with said liquid metal in case of rupture of said second flexible wall to contain said liquid metal.

15. In a pressure operated actuator of a class described wherein a liquid metal is utilized: an air filled safety chamber; a concentric liquid metal filled chamber inside said safety chamber and having a common flexible wall therewith; said outer chamber containing said liquid metal in case of rupture of said wall; a second liquid metal filled chamber concentric with said first liquid metal filled chamber; means including an electromagnetic liquid metal pump connecting said first and second liquid metal filled chambers; and an oil filled safety chamber inside said second liquid metal filled chamber and having a second common flexible wall therewith; said second liquid metal filled chamber and said oil filled chamber having said second common flexible wall so that said oil can transmit any motion of said second wall; said oil mixing with said liquid metal in case of rupture of said second flexible wall to contain said liquid metal.

References Cited in the file of this patent

UNITED STATES PATENTS

| | | |
|---|---|---|
| 1,712,882 | Gleason et al. | May 14, 1929 |
| 2,352,390 | Kirkland | June 27, 1944 |
| 2,597,050 | Audemar | May 20, 1952 |
| 2,673,527 | Ashton et al. | Mar. 30, 1954 |
| 2,744,385 | Hohenner | May 8, 1956 |